July 16, 1929. R. H. HUMMERT 1,720,836
SPOT LAMP FOR AUTOMOBILES AND THE LIKE
Filed Jan. 11, 1927

INVENTOR,
Robert H. Hummert,
BY
ATTORNEY.

Patented July 16, 1929.                                                                1,720,836

UNITED STATES PATENT OFFICE.

ROBERT H. HUMMERT, OF DAYTON, OHIO, ASSIGNOR TO THE S. H. THOMSON MANUFACTURING COMPANY, OF DAYTON, OHIO, A CORPORATION OF OHIO.

SPOTLAMP FOR AUTOMOBILES AND THE LIKE.

Application filed January 11, 1927. Serial No. 160,488.

This invention relates to new and useful improvements in spot lamps for automobiles and the like.

It is one of the principal objects of the invention to provide in a spot lamp structure, to take the place of a tooth clutch, friction means for holding the lamp stationary after it has been turned to an adjusted position on its horizontal axis. This conduces to a silent, easy and safe operation of the lamp.

Figure 1:
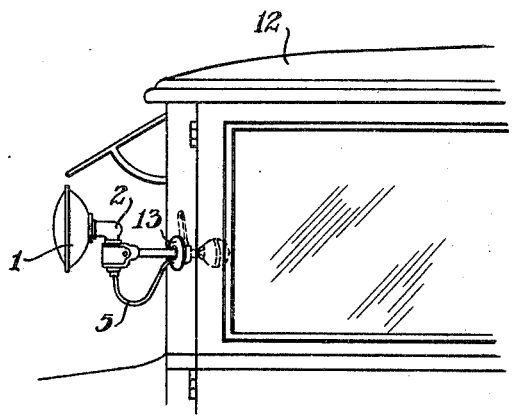
Figure 2:
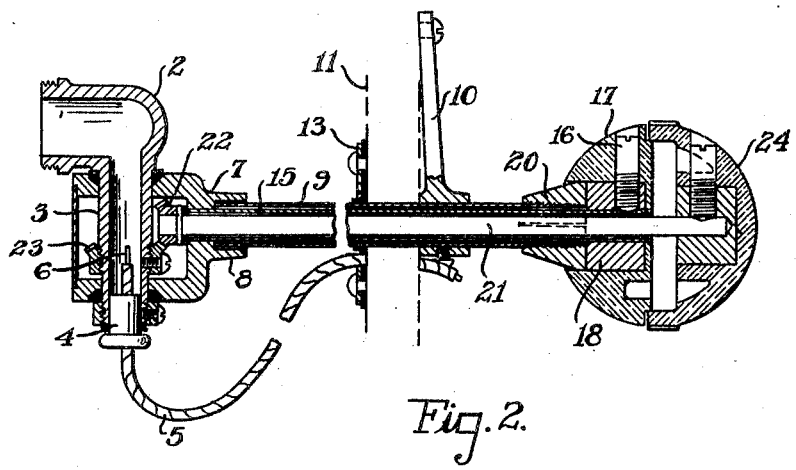
Figures 3, 4:
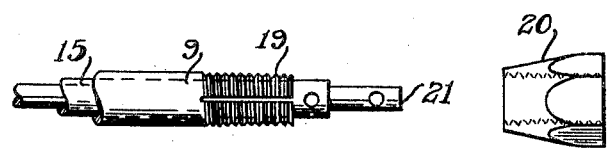

In the accompanying drawings illustrating my invention, Figure 1 is a side elevational view of the front portion of an automobile body, showing my improved spot lamp attached to a front corner post of the same. Figure 2 is a longitudinal, sectional view taken through said spot lamp structure. Figure 3 is a side view of the slotted, threaded end of the bearing sleeve for the lamp operating tube and shaft, which are shown within it. And Figure 4 is a side view of the adjusting nut that is applied to the threaded end of the bearing sleeve.

Referring to the accompanying drawings for a detailed description of my invention, the numeral 1 designates a spot lamp which is mounted on an L-shaped extension 2 of a vertical shaft 3. The latter is hollow at its lower end to receive a rubber grommet 4 for securing the shaft 3 to a metal hose 5 which receives an electric cord 6 that conducts electric current to the spot lamp 1.

The shaft 3 is pivoted within a bracket or housing 7 which terminates at its rear end in a cylindrical portion 8 having a hollow center in which there is loosely fitted one end of a sleeve 9 about which said housing 7 is free to rotate. Secured to the tube 9 is a bracket arm 10 attachable to a front corner post 11 of an automobile 12 after the tube 9 has been passed through a hole in said post and in an elliptical plate 13 secured to the outer face of the latter. Through the hole in the plate and corner post the metal hose 5 carrying the electric cord 6 is passed.

Free to rotate in the sleeve 9 is a hollow shaft 15 that projects into the cylindrical end 8 of the housing 7 for firm attachment to it. Fixedly secured to the outer end of the hollow shaft 15 by a screw 16 is a semi-spherical handle portion 17 preferably made of bakelite. This handle portion 17 has a central recess of uniform diameter in which there is molded a brass collar 18 through a hole in which the attaching screw 16 projects. By means of the handle portion 17, the shaft 15 may be easily rotated to rock the spot lamp 1 about its horizontal axis to bring it to a desired position.

For the purpose of holding the spot lamp in its adjusted position with respect to its horizontal axis, I have provided the following means. Referring to Figures 2, 3 and 4, the sleeve 9 has a split, threaded end 19 to receive a tapered nut 20, the head of which is received by the recess in the handle portion 17. The split end of the sleeve 9 is tapered so that when the nut 20 is screwed upon it, the sleeve will apply the desired friction to the shaft 15 to hold it in any position to which it has been rotated by the handle 17. This frictional contact between the split end of the sleeve 9 and the shaft 15 may be easily adjusted by the nut 20. A tooth clutch for holding the spot lamp 1 in a desired position with respect to the shaft 15, is therefore replaced by my improved friction means which are simple, compact and unable to pinch the fingers of the hand which turns the handle portion 17.

For the purpose of rotating the spot lamp 1 about the vertical axis of the shaft 3, there is provided a shaft 21 which passes through the hollow shaft 15 in which it is free to rotate. Fixedly secured to the front end of this shaft 21 within the housing 7 is a bevel gear 22 that meshes with a bevel gear 23 fast on the vertical shaft 3 within the housing. Through the bevel gear connection between the shafts 3 and 21, the spot lamp 1 may be rotated about the vertical axis of the shaft 3 by a semi-spherical handle portion 24 secured to the shaft 21 in the same manner that the handle portion 17 is attached to the tube 15. (See Figure 2.)

Having described my invention, I claim:

In a device of the type described, a spotlamp supporting housing terminating in a hollow cylindrical end, a sleeve projecting into the latter to form a bearing for the housing, and having a split, tapered, threaded, outer end, a horizontal shaft projecting through said sleeve into the cylindrical end of said housing for connection to the latter to turn it around the sleeve, a hollow operating member secured to the horizontal shaft, and a nut on the split end of the sleeve, the head of the nut projecting into the hollow operating member.

In testimony whereof I have hereunto set my hand this 10th day of January, 1927.

ROBERT H. HUMMERT.